Sept. 23, 1924.

A. S. HOWELL 1,509,556

INTERMITTENT FEED MECHANISM

Filed Sept. 8, 1921    5 Sheets-Sheet 1

Inventor:-
Albert S. Howell
By:- Miehle & Miehle  Atty's.

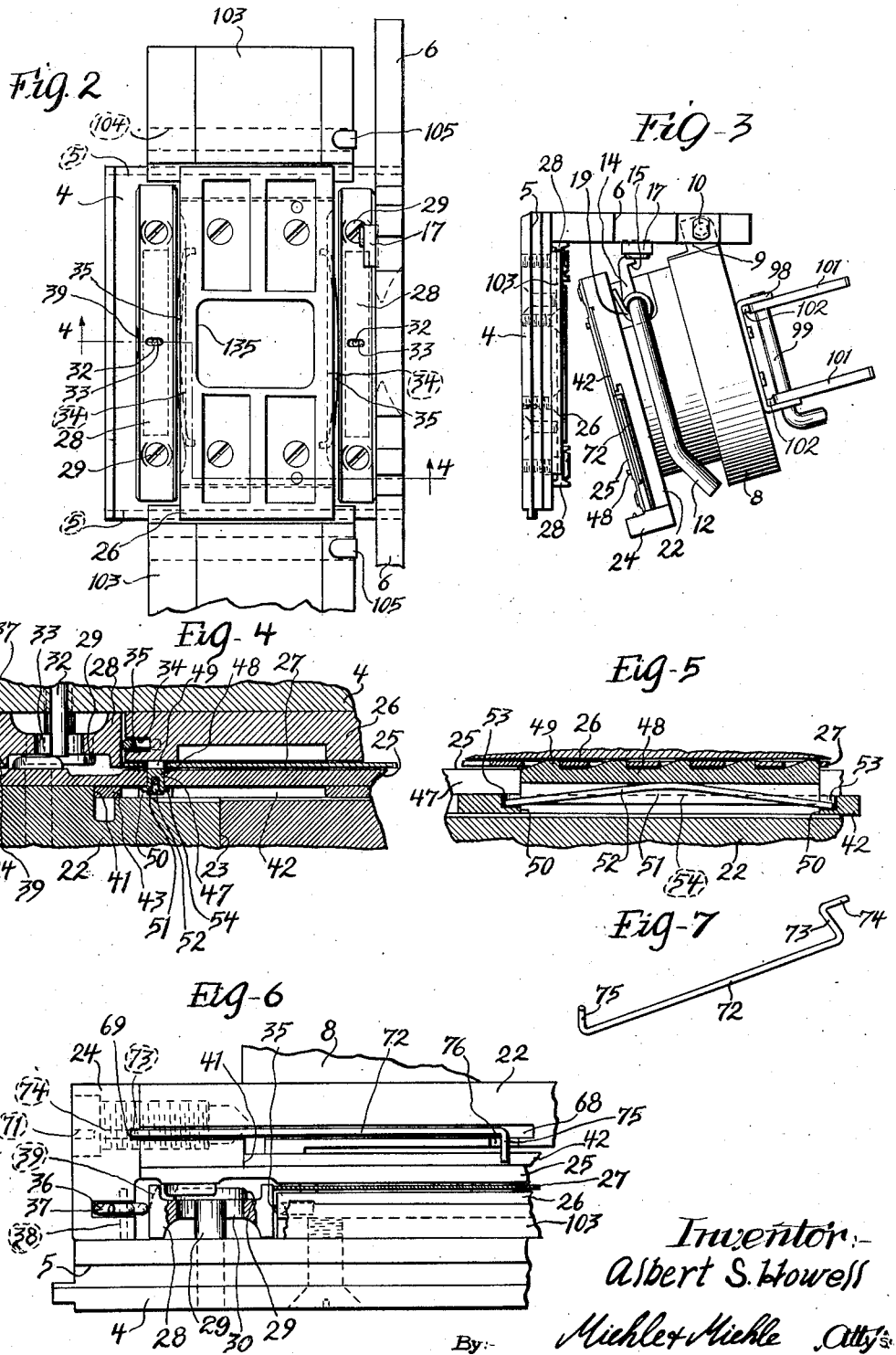

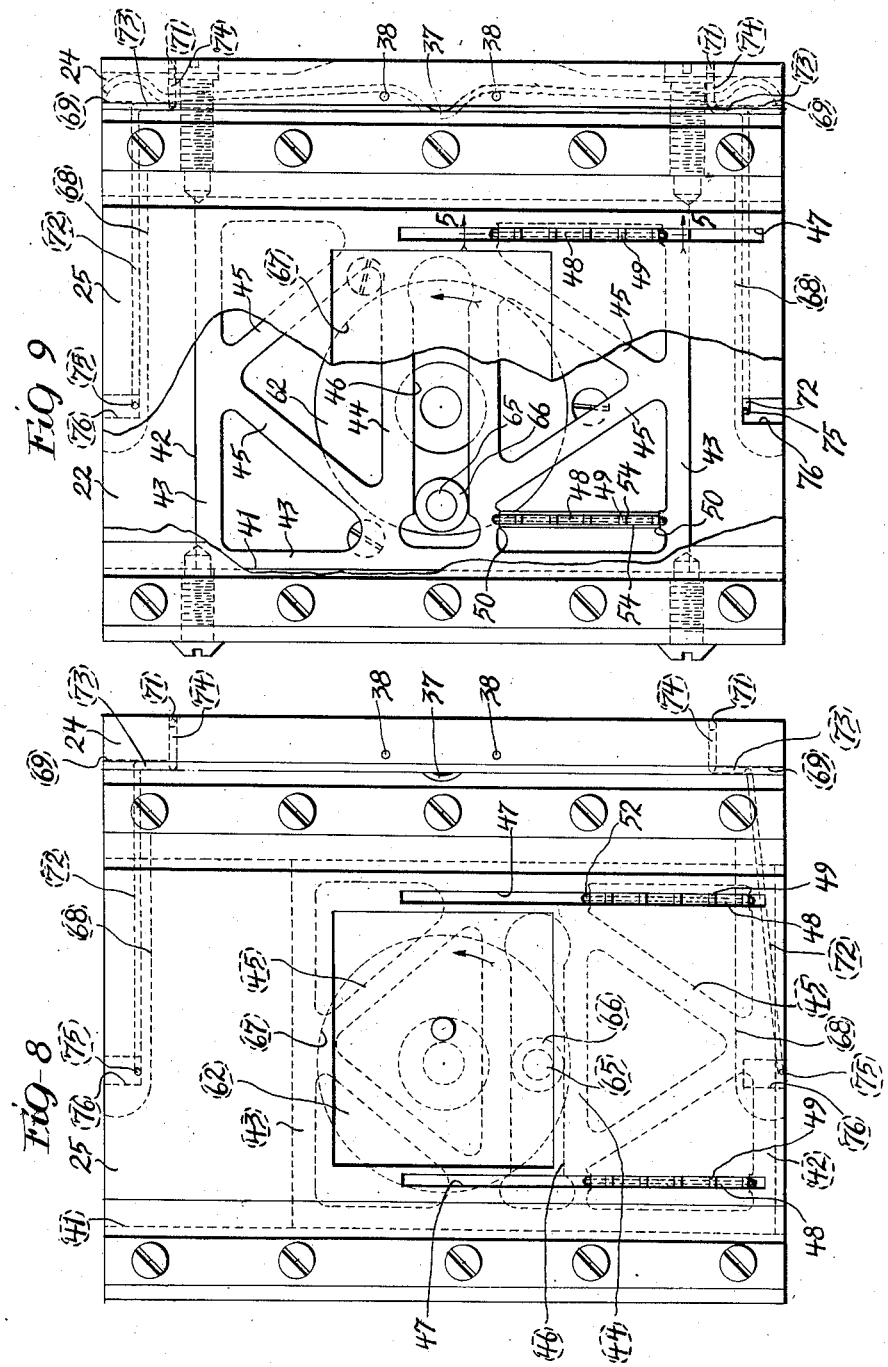

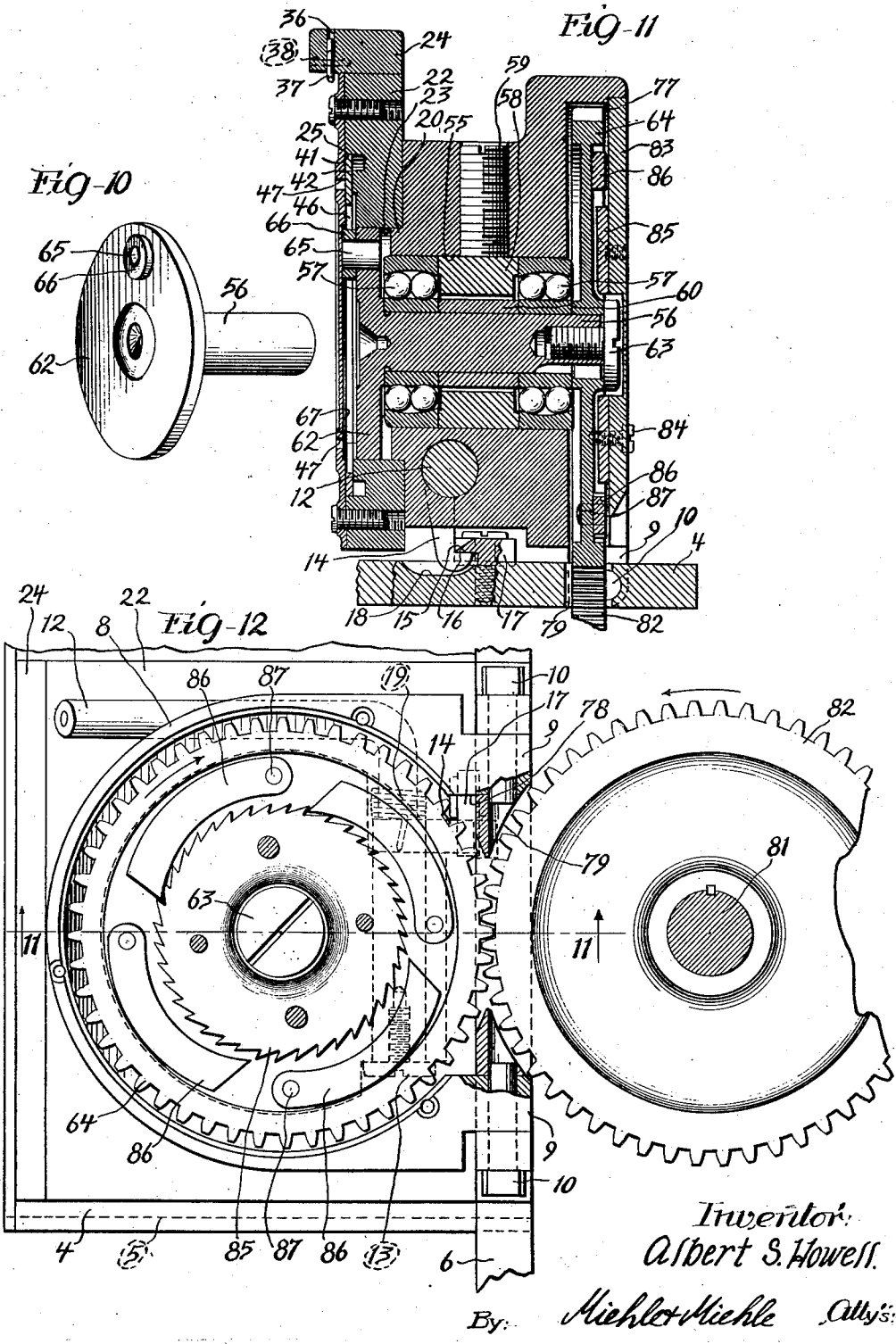

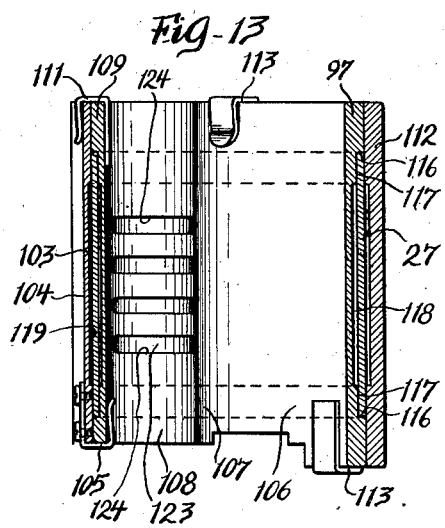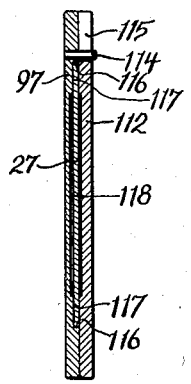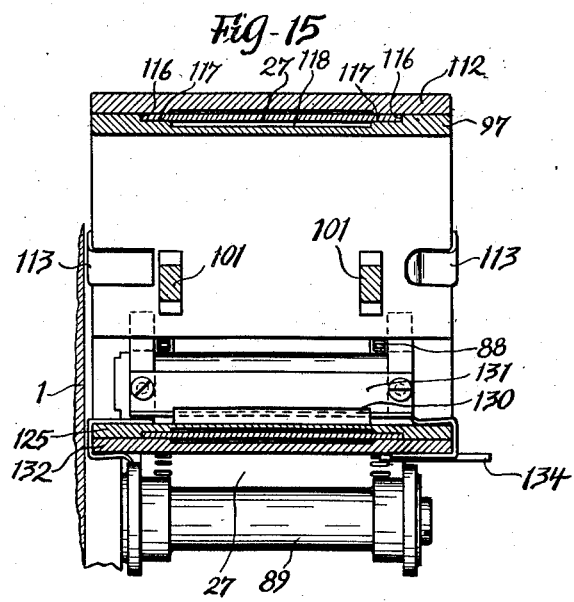

Patented Sept. 23, 1924.

1,509,556

UNITED STATES PATENT OFFICE.

ALBERT S. HOWELL, OF CHICAGO, ILLINOIS, ASSIGNOR TO BELL & HOWELL COMPANY, OF CHICAGO, ILLINOIS, A CORPORATION OF ILLINOIS.

INTERMITTENT-FEED MECHANISM.

Application filed September 8, 1921. Serial No. 499,294.

*To all whom it may concern:*

Be it known that I, ALBERT S. HOWELL, a citizen of the United States, residing at Chicago, in the county of Cook and State of Illinois, have invented a certain new and useful Improvement in Intermittent-Feed Mechanism, of which the following is a full, clear, concise, and exact description, reference being had to the accompanying drawings, forming a part of this specification.

My invention relates particularly to intermittent feed mechanism for motion picture machines although not limited to this use alone.

The main feature of the invention relates to the provision of intermittent feed mechanism which is adapted for operation to feed at very high speeds such as is necessary in the operation of a motion picture camera in the taking of "ultra speed" pictures.

The above feature and certain other features hereinafter are embodied in the preferred form of my invention hereinafter fully described and illustrated in the accompanying drawings, and are effected by certain novel constructions, combinations, and arrangements of parts particularly pointed out in the claims.

In the said drawings—

Figure 2 is an enlarged assembly view of a portion of the intermittent feed device of the camera with portions broken away.

Figure 3 is an enlarged top plan view of the intermittent feed device.

Figure 4 is an enlarged section of a portion of the intermittent feed device taken on the line 4—4 of Fig. 2.

Figure 5 is an enlarged section of a portion of the intermittent feed device taken on the line 5—5 of Fig. 9, hereinafter described.

Figure 6 is an enlarged top plan view of a portion of the intermittent feed device, with parts broken away.

Figure 7 is a perspective view of one of the cushioning springs hereinafter described.

Figures 8 and 9 are similar views in front elevation of a portion of the intermittent feed mechanism showing the parts in different positions of their cycle, Fig. 9 having a part broken away.

Figure 10 is a perspective view of the rotating crank device of the intermittent feed mechanism.

Figure 11 is an enlarged section of a portion of the intermittent feed mechanism with parts broken away and taken on the line 11—11 of Fig. 12, hereinafter described:

Figure 12 is an enlarged partial view in rear elevation of the intermittent feed mechanism with parts removed and broken away.

Figure 13 is an enlarged sectional view taken on the line 13—13 of Fig. 1.

Figure 14 is an enlarged section taken on the line 14—14 of Fig. 1.

Figure 15 is an enlarged sectional view taken on the line 15—15 of Fig. 1.

Like characters of reference indicate like parts in the various views.

Figure 1:
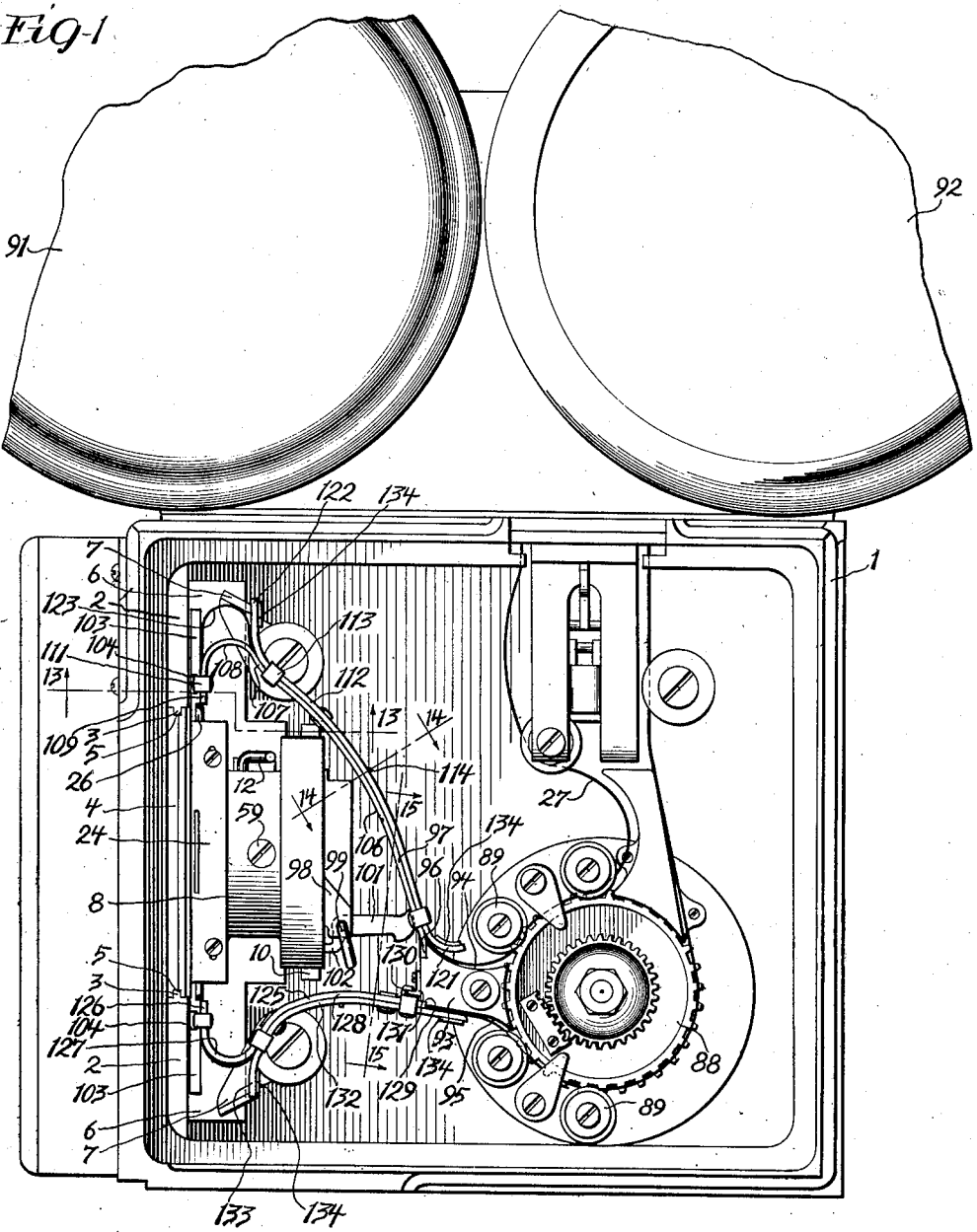
Figure 1 is a partial side elevation of a motion picture camera with the door of the casing removed to show the mechanism enclosed therein.

In the said drawings 1 designates a camera casing of usual construction having an open side which is closed by a removable cover, not shown, when the camera is to be operated to take pictures. The inner surface of the front wall of the casing has two vertically spaced plates 2 secured thereon, and the opposed edges of these plates are disposed in parallel and have longitudinally extending parallel ribs 3 formed thereon. A frame piece 4, which is L-shaped in horizontal cross section, has the top and bottom edges of one leg thereof parallel and formed with longitudinally extending grooves 5 engaging respective ribs 3 to mount the frame piece in the casing. This leg of the frame piece extends transversely in parallelism with the front wall of the casing when the frame piece is mounted therein, and the other leg of said frame piece extends rearwardly therefrom alongside the closed side of the casing. This rearwardly extending leg has upwardly and downwardly projecting extensions 6 adjacent the front wall of the casing which are clamped against the side wall of the casing by clamp levers 7 pivoted to the side of the casing and overlying these extensions when in clamping position to lock the frame piece in its mounting. A support member 8 lies in the angle of said frame piece and is pivotally mounted on said frame piece in the following manner. The support member 8 has two vertically spaced ears 9 extending laterally therefrom into respective openings at the rear end of the rearwardly extending leg of the frame piece, and vertically spaced pivot pins 10 engage registering bores disposed on a vertical axis and formed in the frame piece and ears 9, thereby permitting pivotal movement of the support member 8 with respect to the frame piece. The support member can be pivoted on the pins 10 from an inoperative position, as shown in Fig. 3, to an operative position adjacent the frame piece as shown in Fig. 11. An L-shaped rod member 12 has one leg thereof circular in cross section and pivotally mounted in a vertical bore of the support member 8 forwardly of the ears 9. The shape of the support member 8 is generally circular on a horizontal axis, and the surface thereof surrounding the top and bottom of the last mentioned bore is recessed to form flat surfaces normal to the axis of the rod member, against the lower of which surfaces the head of a screw 13, screw-threaded into the lower end of the vertical leg of the rod member, bears to prevent upward movement of the rod member, and against the upper of which surfaces the hub of a lock arm 14, formed on the rod member, bears to prevent downward movement of the rod member, the other leg of the rod member is reduced and extends horizontally away from the rearwardly extending leg of the frame piece 4 over the top of the support member 8 so that the rod member may be conveniently manipulated. See Figs. 3, 11, and 12. The lock arm 14 extends toward the rearwardly extending leg of the frame piece 4 and has a hook formation 15 at its outer end which is adapted to lie back of a lock surface 16 of a block 17, secured to the rearwardly extending leg of the frame piece 4, when the support member 8 is in operative position as shown in Figs. 1, 11, and 12. The rearwardly extending leg of the frame piece 4 is recessed, as designated at 18, see Fig. 11, to permit movement of the lock arm into and out of locking engagement with the surface 16 of block 17. A torsional spring 19 encircles the rod member 12 just above the arm 14, and has one end thereof turned longitudinally of the axis of the rod member 12 and engaged in a similarly disposed hole in the hub of arm 14, see Fig. 12, and has the other end thereof extending tangentially and engaged with the rear face of a vertically disposed plate 22 which is secured to the forward end of the support member 8 as hereinafter described. This spring tends to turn the rod member in a clockwise direction in Fig. 3 and serves to maintain the hook formation 15 of the lock arm in locking relation with the surface 16 of the block 17 when the support member 8 is in operative position.

The support member 8 is bored longitudinally on an axis normal to the aforementioned transversely extending leg of the frame piece 4 when in operative position, and the front surface of the support member 8 is faced normal to such axis and is provided with a circular forwardly projecting portion 20 disposed concentrically with said bore and forming an annular shoulder concentric with said bore. The hereinabove mentioned vertically disposed plate 22 is rectangular in form and is secured against the vertical front face of the support member 8 with the side edges thereof extending vertically and has a bore 23 therethrough disposed concentrically with the bore of the support member 8 and into the rear end of which the projecting portion 20 of the support member 8 fits. A vertically disposed rail 24 is secured to the edge of the plate 22, which lies on the side of the support member 8 opposite that from which the ears 9 project, and extends forwardly of the plate 22 and abuts the rear face of the transversely extending leg of the frame piece 4 when the axis of the bore of the support member 8 is normal to said transversely extending leg. The hook formation 15 of the lock arm 4 in its engagement with the surface 16 of the block 17 maintains the rail 24 in abutting relation with said transversely extending leg of the frame piece 4 whereby the support member 8 and parts carried thereby are positively secured in operative position. Secured to the front face of the plate 22 is a rectangular vertically disposed plate 25, and secured to the rear face of the transverse leg of the frame piece 4 is a relatively narrow rectangular vertically disposed plate 26 disposed centrally of the plate 25. The aforementioned plates lie in parallelism when the support member 8 is in operative position, and when said support member is in said operative position the plates 25 and 26 are spaced to guide opposite faces of a motion picture film 27 therebetween. See Figs. 4, 5, and 6. A pair of vertically disposed guide rails 28 are mounted with the plate 26 one at each vertical edge thereof, and are mounted on the transverse leg of the frame piece 4 by means of headed and shouldered screws 29 passing through holes 30 in the guide rails and screw threaded into said transverse leg, said holes being elongated transversely to permit movement of said guide rails to and from each other. The rails 28 are further guided for such movement by pins 32 secured on said transverse leg of the frame piece and projecting rearwardly therefrom through transversely elongated holes 33 in respective guide rails. See Figs. 2 and 4. Each edge of the plate 26 is provided with a longitudinal groove 34, see Figs. 2 and 4, and a pair of bow springs 35 have their ends entered in respective grooves and have the extreme ends thereof turned and entered in respective holes in the plate formed at the bottom of respective grooves. The centers of the bow springs 35 project outwardly from respective edges of the plate 26 and engage respective guide rails 28 to maintain the same away from respective edges of this plate. The guide rails 28 project rearwardly from the rear surface of the plate 26 and guide opposite edges of the film 27 when in guiding relation. The guide rail adjacent the rearwardly extending leg of the frame piece 4 is maintained against the surface of this leg, and the other guide rail is caused to yieldably press the film edgewise against the first mentioned guide rail when the support member 8 is in operative position in the following manner. The rail 24 lies on the outside of the adjacent guide rail 28 when the support member 8 is in operative position and has a longitudinal groove 36 formed therein, facing this guide rail, and engaged in this groove is a bow spring 37, the ends of which engage the bottom of said groove, and the center of which has a reverse curve hump projecting outwardly from the groove and engaging the opposing face of the adjacent guide rail 28 to yieldably move it toward the other guide rail against the influence of the spring 35 engaging the opposite face of the first mentioned guide rail. See Figs. 4, 6, 8, and 9. The spring 37 is held in partially compressed condition in the groove 36 by a pair of pins 38 secured in the rail 24 and extending across the groove 36 outwardly of the spring on respective sides of the aforementioned hump in the spring. The portion of the surface of the guide rail 28 adjacent the rail 24 which is engaged by the spring 37 is cut away, as designated at 39, see Figs. 2 and 4, to form a slanted surface slanting rearwardly away from the rail 24 from the point of contact of the spring 37 therewith when the film guide, comprising the plates 25 and 26 and the guide rails 28, is closed so that the spring 37 moves therealong without interference as the guide is closed. Thus it will be noted that when the guide is open the rails 28 are separated permitting easy insertion of the film therein, the guide rails being caused automatically to assume guiding relation with the film as the guide is closed.

The front face of the plate 22 has a wide relatively shallow vertically extending channel 41 formed therein which cooperates with the rear face of the plate 25 to guide an elongated rectangular plate 42 for longitudinal vertical movement in the plane thereof. See Figs. 4, 6, and 11. The plate 42 has openings therein forming a rectangular marginal portion 43, a central cross portion 44 extending between the long sides, and angle truss portions 45 extending from points adjacent respective ends of the cross portion 44 to the centers of respective end marginal portions. See Figs. 8 and 9. The central cross portion 44 has a slot 46 formed therein extending between the long sides of the plate which is engaged by a rotating crank device, hereinafter described, to effect reciprocation of the plate in its guide. The openings in the plate 42 materially reduce the weight thereof and provide a formation which withstands the stresses to which the plate is subjected during reciprocation thereof at extremely high speeds.

The plate 25 has a pair of vertically extending slots 47 therethrough disposed in parallelism at the lower portion of this plate. These slots are disposed to aline with respective rows of perforations of the film 27 in the guide, and are disposed just within respective longitudinal marginal portions of the plate 42. See Figs. 8 and 9. Guided for longitudinal movement in respective slots 47 is a pair of similarly disposed plural toothed ratchet bars 48 having the teeth 49 thereof facing said plate 26. See Figs. 4 and 5. These bars project rearwardly of the plate 25 into respective openings in the plate 42 between the cross portion 44 and the lower marginal end portion thereof, and abutment portions 50 are formed on these portions of the plate 42 forming vertically spaced opposed surfaces engaging opposite ends of the ratchet bars to reciprocate the same in said slots with the plate 42 and adapted to permit movement of the ratchet bars, independently of the plate 42, normal to their plane of movement to and from the plate 26. The ratchet bars have longitudinal grooves 51 formed therein facing away from the plate 26, and bow springs 52 are engaged in respective grooves 51 and engage the plate 42 with their ends to yieldably urge the ratchet bars toward the plate 26. The plate 42 has recess formations 53 at the ends of the bars which receive the ends of the bow springs for longitudinally retaining the same. The abutment surfaces of the teeth 49 face downwardly, and when the plate 42 is moved downwardly the teeth 49 project through perforations in the film 27, the tops of said teeth bearing against the rear surface of plate 26, see Fig. 5, and the abutment surfaces of the teeth abut the upwardly facing edges of the perforations of the film and move the film downwardly. When the plate 42 is moved upwardly the cam surfaces of the teeth 49 cause the bars to ratchet over the film perforations, the bars being moved rearwardly against the influence of the springs 52, so that the film remains stationary during this movement, the frictional engagement of the guide rails 28 with the film and the bearing of the film against the plate 26 being sufficient to prevent any tendency of the film to move during this movement of the plate 42. The ratchet bars have longitudinal flanges 54 formed thereon which are disposed at the rear of the plate 25 and engage the rear face of this plate to limit forward movement of the bars under the influence of springs 52 when the support member is in inoperative position with the plates 25 and 26 separated as shown in Fig. 3.

As hereinbefore mentioned the support member 8 is bored on a horizontal axis normal to the transversely extending leg of the frame piece 4 when the support member 8 is in operative position. The axis of this bore is accordingly normal to the plates 22, 25, and 42 which are disposed in parallelism with each other and lie in parallelism with said transverse extending leg when the support member is in operative position. The forward end of this bore is reduced, as designated at 55, and supported for rotation in this bore on an axis coincident with the axis of the bore is a shaft 56. See Fig. 11. This shaft is carried on two radial and thrust ball bearings 57, the outer races of which are engaged in said bore 55 and separated by a collar 58 which is secured in the bore by a set screw 59, and the inner races of which engage the shaft and are separated by a collar 60 encircling the shaft, these inner races and the collar 60 being clamped against a crank disk 62, formed at the front end of the shaft, by a headed screw 63 screw threaded into the rear end of the shaft and bearing against the hub of a spur gear 64 mounted on the rear end of and keyed to the shaft and bearing against the rear face of the inner race of the rear bearing 57. The crank disk 62 is disposed in the bore 23 of the plate 22 and has a crank pin 65 secured therein which projects forwardly therefrom and has a roller 66 rotatably mounted thereon, which roller engages the slot 46 of the plate 42 to reciprocate the plate when the shaft 56 is rotated. The roller and crank pin project a short distance forward of the plate 42 into a circular recess 67 formed in the rear surface of the plate 25 and disposed concentrically with the shaft 56 to insure a full bearing of the roller 66 in the slot 46.

The plate 22 has grooves 68 formed in the top and bottom edges thereof which extend from the center of respective of said edges of the plate to the side edge against which the rail 24 is secured. See Figs. 6, 8, and 9. The rail 24 has vertical grooves 69 in the surface thereof facing the plate 22 extending from respective ends thereof in line with respective grooves, and has horizontal holes 71 therein extending in the same direction as the grooves 68 and communicating with respective grooves 69.

Two springs 72 are provided which have a right angle offset adjacent one end forming a transverse portion 73 and a longitudinal end portion 74 offset from the main portion thereof. See Fig. 7. The portions 74 of these springs are disposed in respective holes 71 with the portions 73 thereof disposed in respective grooves 69 which portions lie opposite the edge of the plate 22 when the rail 24 is secured thereagainst whereby the springs are secured at their offset ends. When thus secured the main portions of these springs lie in respective grooves 68. The free ends of these springs lie adjacent the vertical center line of the plate 42 and are turned at right angles to the main portions of the springs, as designated at 75, to extend forwardly from such main portions. These ends 75 extend forwardly through openings 76, formed in edges of the plate 22 between the grooves 68 and the front face of the plate, into the plane of the plate 42, see Fig. 6, and normally press against the surfaces formed at the bottom of respective openings 76. See Figs. 8 and 9. The arrangement is such that when the plate 42 reaches an end of its stroke the leading end thereof engages the end 75 of the respective spring and moves the spring against its normal influence until the end of the stroke is reached. See Fig. 8. As the movement of the stroke of the plate is reversed the spring follows the same until it again engages the bottom surface of the respective opening 76. These springs function to cushion and aid in the reversal of the plate 42 and ratchet bars 48.

The hereinbefore mentioned gear 64 is keyed to the rear end of the shaft 56 and is disposed within a rear enlarged portion 77 of the bore of the support member 8. See Figs. 11 and 12. The portion of the wall surrounding this bore between the ears 9 is cut away in the plane of the gear, as designated at 78, thus leaving an opening through which the gear projects, and the rearwardly extending leg of the frame piece 4 has a corresponding opening therethrough, as designated at 79, into which the gear projects. The camera mechanism has a usual rotating shaft 81 which is disposed on the horizontal plane of the shaft 56 on the side of a vertical rearwardly and forwardly extending plane passing through the axis of movement of the support member 8 opposite that on which the shaft 56 lies. A spur gear 82 is keyed to the shaft 81 and projects into the opening 79 and meshes with the gear 64 whereby the shaft 56 is driven by the shaft 81. The gears 64 and 82 are so disposed with relation to the axis of movement of the support member 8 that they remain in mesh during movement of the member 8 through a number of positions of its pivotal position to and from operative position whereby the film guide may be opened for the insertion of film without disturbing the driving relation of the gears. In the arrangement shown the axis of movement of the support member 8 is disposed at the rear side of the gears adjacent the meshing point thereof.

The rear end of the bore portion 77 is closed by a circular plate 83 secured against a rearwardly facing shoulder in this bore portion by headed screws 84 screw threaded into the wall surrounding the bore portion 77 and having their heads entered in recesses formed partially in the wall and the plate to clamp the plate and to secure the plate against rotation on the support member 8. The portion of the plate 83 adjacent the meshing point of the gears is cut away so that it does not interfere with pivotal movement of the support member.

The shaft 81 is connected to drive a constant feed device, hereinafter described, and it will be noted that the ratchet feed mechanism hereinabove described will feed the film in but one direction irrespective of the rotation of the shaft 56 so that both feeding devices will coordinate only when the rotating connecting members are rotated in one direction. To prevent the mechanism from being operated in the reverse direction I provide the following mechanism. A ratchet disk 85 is secured to the front face of the plate 83 in concentric relation with the shaft 56. See Figs. 11 and 12. A plurality of pawls 86 are pivotally mounted at one end thereof on studs 87 which are secured in the web of the gear 64 and disposed in parallelism with the axis of the gear. The pawls are adapted to move into operative relation with the ratchet disk with their gravital tendency as they pass through the upper portion of their circular path, and the pawls and ratchet disk are so arranged that when rotation of the gear 64 is attempted in one direction, counter-clockwise in Fig. 12, at least one pawl will be moved against a tooth of the ratchet disk to prevent such movement. Rotation of the gear 64 in the opposite direction, clockwise in Fig. 12, is permitted, and as the gear is rotated in this direction the centrifugal force caused by such rotation throws the pawls outwardly against the rim of the gear 64. Thus under normal operation the pawls do not bear against the ratchet disk.

Disposed within the casing 1 at the rear of the intermittent feed device hereinabove described is a rotating film sprocket 88 which is disposed on an axis parallel to the plane of the hereinabove described film guide, and rollers 89 are provided to maintain the film engaged with the sprocket in a usual manner. This sprocket is connected to be driven from the shaft 81, in correspondence with the above-described intermittent feed device, by the usual means not shown. The sprocket 88 rotates in a counter-clockwise direction in Fig. 1 and serves to withdraw the film 27 from a film magazine 91 and feed it at a constant rate to the above-described intermittent feed device and to feed the film at a constant rate to a second film magazine 92 from the said intermittent feed device, the magazines 91 and 92 being mounted on top of the casing 1, and the film passing through suitable openings into the casing and over the sprocket 88 to the intermittent feed device and then passing from the intermittent feed device under the sprocket 88 and through suitable openings into the magazine 92.

It is obvious that as the mechanism is operated the length of the film between the sprocket 88 and the intermittent feed device varies during each cycle of the intermittent device. I provide film guide means between the sprocket 88 and the intermittent feed device which accommodates this variance and at the same time uniformily guides the film, and which prevents lasting and irregular movement of the film.

A guide block 93, secured with the camera casing, is disposed immediately forward of the sprocket 88 and has a concave upwardly facing surface 94 which initially guides the film away from the sprocket and a downwardly facing surface 95 which cooperates with one of the rollers 89 to guide the film to said sprocket. See Figs. 1 and 15. The forward upper corner of the block 93 is stepped, as designated at 96, forming upwardly and forwardly facing surfaces, and a guide plate 97 has one end thereof disposed in said step and extends upwardly therefrom to continue the guiding of the film. The other end of this plate is secured as hereinafter described, and said first mentioned end of the plate is held against forwardly facing surface of said stepped portion 96 of the block in the following manner. A bracket 98 is secure on the rearwardly facing surface of the plate 83 and has two horizontally spaced rearwardly extending portions. See Figs. 1 and 3. Pivotally mounted in and extending between said rearwardly extending portions is a horizontally disposed shaft 99, the end of which adjacent the open side of the casing is bent at right angles to the main portion thereof to form a manipulating handle. Secured on the shaft between the rearwardly extending portions of the bracket 98 is a pair of clamping members 101, which have the rear ends rounded to engage and clamp the adjacent end of the guide plate 97 in its engagement with the stepped portion 96 of the block 93 as shown in Fig. 1. The clamp members 101 have feet 102 formed thereon which engage the rear face of the plate 83 to prevent downward movement of the clamp members from their clamping position as shown in Fig. 1. When it is desired to remove the guide plate the clamping members are swung upwardly to a point where the guide plate is released.

The upper and lower edge portions of the plate 26 are stepped rearwardly from the front face thereof forming slots with the rear face of the transverse leg of the frame piece 4, and the ends of guide plates 103 project into respective of these slots and are secured to said transverse leg in a usual manner. The guide plates 103 extend respectively above and below the plate 26, and the main portions of the rear surfaces of these plates are offset rearwardly from the portions thereof in said slots to lie in substantial alinement with the rearwardly facing guide surface of the plate 26. The forwardly facing surface of each plate 103 has a channel 104 extending across the same, and U-shaped spring clips 105 have one leg secured to respective plates in said channels at the edge thereof adjacent the rearwardly extending leg of the frame piece 4 and extend around these edges of the plates and have their other legs disposed opposite the rearwardly facing surfaces of respective plates. See Fig. 13.

The guide plate 97 extends upwardly from the block 93 with a forwardly curving portion 106 which curve merges in a small reversely curved portion 107, which in turn merges into a substantially semi-circular portion 108 extending upwardly therefrom and curving over and merging with a vertical portion 109 extending downwardly therefrom and disposed parallel with and lying against the rearwardly facing surface of the upper plate 103 to form a guide therewith. See Fig. 1. The inner side edge portion of the portion 109 is engaged between the rearward leg of the respective spring clip 105 and the plate 103, and another spring clip 111 has one leg secured to the rearwardly facing surface of the portion 109 at the opposite edge thereof and extending around the adjacent edges of the said portion 109 and the plate 103 and has the other leg thereof engaged with the forwardly facing surface of the channel 104 of the said plate 103. These clips cooperate to secure the portion 109 of said plate 97 with the said plate 103 and permit the plate 97 to be removed and inserted from the open side of the casing 1. Secured to the guide plate 97 and extending in adjacent parallelism therewith on top of the same from the end thereof at the guide block 93 to the end of the portion 107 which merges with the portion 108 is another guide plate 112. This plate is secured with the plate 97 by two pairs of spring clips 113 secured on respective of these plates and disposed with respect thereto in a manner similar to the manner in which the aforedescribed spring clip 111 and opposite spring clip 105 are secured and disposed with relation to the upper guide plate 103 and the portion 109 of plate 97, these clips 113 being disposed to permit disengagement of the plates 97 and 112 by lateral movement of the plate 112 with respect to plate 97 in the direction of the open side of the casing 1. A pin 114 is secured to the plate 97 and projects into a slot 115 formed in the plate 112 and extending transversely from the inner edge thereof to position longitudinally the plates, this arrangement permitting disengagement of these plates in the manner aforesaid. See Fig. 14. The guide plate 97 has its upper film guiding face channeled in step formation for the passing of the film thereover, which channel forms opposed edge guide surfaces 116 guiding the edges of the film, see Figs. 13 and 14, spaced face guide surfaces 117 for guiding a face of the film and a central deep channel portion 118 between the surfaces 117 to prevent contact of the center picture portion of the film with the guide plate. The surface of the guide plate 112 facing the plate 97 is channeled opposite the portion 118 of the channel of the plate 97 for the same purpose and the portions of the said surface of the plate 112 opposite the surface 117 of the plate 97 cooperate with the surface 117 to form a face guide for the film therebetween, and the rearwardly facing surfaces of the plates 103 are channeled, as designated at 119, in a manner similar to the manner in which the plate 112 is channeled. The extreme lower end of the guide plate 112 curves upwardly from the surface 94 of the block 93, as designated at 121, see Fig. 1, to insure a proper entrance of the film into the guide comprising plates 97 and 112. The upper end of the plate 112 curves upwardly at the portion 107 of the plate 97 into a vertical portion 122 spaced from and disposed in substantial parallelism with the upper plate 103 above the semi-circular portion 108 of the plate 97.

In the operation of the camera the film is fed by the sprocket 88 at a constant rate over the surface 94 of the block 93 into the guide formed by the plates 97 and 112. The film then passes over the semi-circular portion 108 of the plate 97 and then down through the guide formed by the upper plate 103 and the vertical portion 109 of the plate 97 into the intermittent feed device where it is fed intermittently in a downward direction as hereinabove described. The portion of the film over the semi-circular portion 108 forms a substantially semi-circular loop 123, see Fig. 1, curving in the same direction as said portion 108 and is engaged at substantially diametrically opposite points by the opposed guide surfaces of the upper plate 103 and the portion 122 of plate 112 whereby it is restricted, and as the length of the film between the two feeding devices varies the said loop moves back and forth along said opposed surfaces to accommodate the same, the loop moving from a position on the semi-circular portion 108 of plate 97 to a position spaced therefrom as indicated in Fig. 1. It will be noted that the said loop is prevented from lashing or moving irregularly in the feeding thereof whereby the film is not injured and does not interfere with the operation of the camera even at the high speeds at which the mechanism is designed to be operated. The semi-circular portion 108 of the plate 97 is perforated, as designated at 124, see Fig. 13, to permit the free movement of air therethrough during vibration of the loop of the film.

The portion 109 of the plate 97 forms a positive film guide portion with the lower portion of the upper guide plate 103, and the plate 112 forms a positive film guide portion with the portions 106 and 107 of the plate 97. The corresponding ends of these positive film guide portions, i. e., the upper ends thereof are disposed at acute angles, and the loop guiding portion of the guide guides the film therebetween in a loop in the manner described. This arrangement of said corresponding ends serves to guide the film conveniently to and from the loop guiding portion of the guide.

Thus is the film conducted from the sprocket 88 to the intermittent feed device, and the film is conducted from the intermittent feed device back to the sprocket in a very similar manner which I will now briefly describe. A plate 125, corresponding with the plate 97 except in minor details, has a vertical portion 126 extending in parallelism with and lying against the rearwardly facing surface of the lower plate 103 to form a guide therewith, and is secured therewith by means similar to the means by which the portion 109 of the plate 97 is secured to the upper plate 103 which means includes the clip 105 of the lower plate 103. The lower end of the portion 126 merges with a rearwardly extending semi-circular portion 127, similar to the portion 108 of plate 97 but reversely disposed with respect thereto, the rear end of which portion 127 merges into a rearwardly extending guide portion 128 which curves therefrom in a reverse direction and has its rear end disposed in an upwardly stepped portion 129 at the lower forward corner of the block 93 with the lower surface of said rear end thereof extending in substantially the same plane as the lower surface 95 of the block. See Fig. 1. The center portion of the rear end of the plate 125 is cut and off-set upwardly, as designated at 130, and overlies a forwardly projecting ledge of a securing member 131 which is secured to the forward face of the block 93. See Figs. 1 and 15. This arrangement serves to hold the rear end of the plate 125 against the downwardly facing surface of the stepped portion 129 and permits the plate to be removed and inserted through the open side of the casing 1. A plate 132, corresponding with the plate 112, is secured to the plate 125 in a manner similar to that in which the plate 112 is secured to the plate 97. The said plate 132 extends in adjacent parallelism underneath the plate 125 from the block 93 to the semi-circular portion 127 where it turns downwardly into a vertical portion 133 spaced from and disposed in substantial parallelism with the lower plate 103 below the semi-circular portion 127. The rear end of the plate 132 extends for some distance underneath the surface 95 of the block 93 for the proper guidance of the film to the sprocket 88. The lower plate 103 and the plates 125 and 132 are channeled in a manner similar to the manner in which the upper plate 103 and the plates 97 and 112 are channeled and for the same purpose, and the semi-circular portion 127 is perforated in a manner similar to that in which the semi-circular portion 108 of the plate 97 is perforated and for the same purpose.

The inner edges of the plates 97 and 125 lie adjacent the side wall of the casing 1, and the plates 112 and 132 have stay pieces 134 secured thereto and extending laterally toward the open side of the casing which engage the cover closing said open side to prevent movement of the plates 97, 112, 125, and 132 out of proper position in the direction of the cover. See Figs. 1 and 15.

The plate 26 has a frame aperture 135 therethrough, see Fig. 2, and the transverse leg of the frame piece 4 has an aperture registering therewith through which the light from the camera lens is periodically permitted to expose progressive sections of the film opposite the aperture 5 by a shutter operated in timed relation with the intermittent feed device as is usual.

While I have shown and particularly described the preferred embodiment of my invention I do not wish to be limited to the precise details of construction shown as changes may readily be made without departing from the spirit of my invention but having thus described my invention I claim as new and desire to secure by Letters Patent the following:—

1. An intermittent feed mechanism including a stationary plate having two parallel slots therethrough, means forming a guide therewith including a stationary member facing a face of said plate opposite said slots, a pair of ratchet bars guided for longitudinal movement in respective slots and adapted for movement normal to said plate, a member mounted for reciprocation parallel with said slots opposite the other face of said plate and having oppositely facing surfaces spaced longitudinally of said slots and oppositely engaging said bars to cause the same to reciprocate therewith and adapted to permit movement of the bars normal to said plate, springs engaging said reciprocating member and respective bars for yieldably urging said bars toward said stationary member, and a rotating device for effecting reciprocation of said reciprocating member.

2. An intermittent feed mechanism including a member mounted for reciprocating movement and having oppositely facing surfaces spaced longitudinally of the movement thereof and having a slot therein disposed transversely of the movement thereof, a pair of similarly disposed ratchet members spaced laterally of the plane of movement of said member and oppositely engaged between oppositely facing surfaces of said first mentioned member for reciprocation therewith and for movement with respect thereto normal to the plane of their reciprocating movement, means for limiting movement of said ratchet members in one direction of said second mentioned movement thereof, springs engaging said first mentioned member and respective ratchet members for yieldably urging said ratchet members in said one direction, and a rotating crank device engaging said slot for reciprocating said first mentioned member.

3. An intermittent feed mechanism including a plate mounted for reciprocating movement in the plane thereof and having openings forming opposed surfaces spaced longitudinally of the movement thereof and having a slot therein disposed transversely of the movement thereof, a pair of similarly disposed ratchet bars spaced laterally of the plane of movement of said plate and extending longitudinally of the same and oppositely engaged between opposed surfaces of the plate for reciprocation therewith and for movement with respect thereto normal to the plane of the plate, means for limiting movement of said bars in one direction of said second mentioned movement thereof, springs engaging said plate and respective bars for yieldably urging said bars in the same direction, and a rotating crank device engaging said slot for reciprocating said plate.

4. An intermittent feed mechanism including an elongated rectangular plate mounted for longitudinal reciprocating movement, said plate having openings therein forming a rectangular marginal portion, a central cross portion extending between the long sides, and angle truss portions extending from points adjacent respective ends of the cross portion toward the centers of respective end marginal portions, and having a slot formed in the cross portion thereof extending between the long sides, a pair of similarly disposed ratchet bars spaced laterally of the direction of reciprocation of the plate and extending longitudinally of the same and engaged between opposing surfaces of the plate between a marginal end portion and the central cross portion thereof for reciprocation with the plate and for movement with respect thereto normal to the plane of the plate, means for limiting movement of said bars in one direction of said second mentioned movement thereof, resilient means engaging said plate and said bars for yieldably urging said bars in the same direction, and a rotating crank device engaging said slot for reciprocating said plate.

5. An intermittent feed mechanism including an elongated rectangular plate mounted for longitudinal reciprocating movement, said plate having openings therein forming a rectangular marginal portion, a central cross portion extending across between the long sides and angle truss portions extending from points adjacent respective ends of the cross portion toward the centers of respective end marginal portions and having a slot in the central cross portion thereof extending between the long sides, a pair of similarly disposed plural toothed ratchet bars spaced laterally of the direction of reciprocation of the plate and extending longitudinally of the same and engaged between opposing surfaces of the plate between a marginal end portion and the central cross portion thereof for reciprocation with the plate and for movement with respect thereto normal to the plane of the plate and having longitudinal grooves facing in a direction normal to the plate, means limiting movement of said bars in one direction of the second mentioned movement thereof, bow springs engaged in respective grooves and engaging said plate for yieldably urging said bars in the same direction, said plate having formations receiving the ends of said springs adapted to retain the springs longitudinally of said bars, and a rotating crank device engaging the slot of said plate for reciprocating the same.

6. An intermittent feed mechanism including a stationary plate having two parallel slots therethrough, means forming a guide therewith including a stationary guide member facing a face of said plate opposite said slots, a second plate facing the other face of said stationary plate and mounted for reciprocating movement in its plane longitudinally of said slots, said second plate having openings forming oppositely facing surfaces spaced longitudinally of said slots, a pair of plural toothed similarly disposed ratchet bars guided for longitudinal movement in respective slots and oppositely engaged by said oppositely facing surfaces of said second plate for reciprocation therewith and for movement with respect thereto to and away from said stationary guide member, springs for yieldably urging said bars toward said stationary member, and a rotating device for reciprocating said second plate.

7. An intermittent feed mechanism including a stationary plate having two parallel slots therethrough, means forming a guide therewith including a stationary guide member facing a face of said plate opposite said slots, a second plate facing the other face of said stationary plate and mounted for reciprocating movement in its plane and longitudinally of said slots, said second plate having openings forming opposed surfaces spaced longitudinally of said slots and having a slot therein extending transversely of its movement, a pair of similarly disposed ratchet bars guided for longitudinal movement in respective slots of said stationary plate and engaged between said opposed surfaces of said second plate for reciprocation therewith and for movement with respect thereto to and away from said stationary member, springs for yieldably urging said bars toward said stationary member, and a rotating crank device engaging the slot of said second plate for reciprocating the same.

8. An intermittent feed mechanism including a stationary plate having two parallel slots therethrough, means forming a guide therewith including a stationary member facing a face of said plate opposite said slots, a second plate facing the other face of said stationary plate and mounted for reciprocating movement in its plane longitudinally of said slots, said second plate having openings forming oppositely facing surfaces spaced longitudinally of said slots, a pair of similarly disposed ratchet bars guided for longitudinal movement in respective slots and oppositely engaged by said oppositely facing surfaces of said second plate for reciprocation therewith and for movement with respect thereto to and away from said stationary guide member and having grooves therein, bow springs engaged in respective grooves and engaging said second plate for yieldably urging said bars toward said stationary member, and a rotating device for reciprocating said second plate.

9. An intermittent feed mechanism including a stationary plate having two parallel slots therethrough, means forming a guide therewith including a stationary member facing a face of said plate opposite said slots, a second plate facing the other face of said stationary plate and mounted for reciprocating movement in its plane longitudinally of said slots, said second plate having openings forming opposed surfaces spaced longitudinally of said slots, a pair of plural toothed similarly disposed ratchet bars guided for longitudinal movement in respective slots and oppositely engaged by opposed surfaces of the second plate for reciprocation therewith and for movement with respect thereto to and away from said stationary member and having longitudinal grooves therein, bow springs engaged in respective grooves and engaging said second plate with their ends for yieldably urging said bars toward said stationary member, said second plate having formations receiving the ends of said springs to retain the same longitudinally of said bars, and a rotating device for reciprocating said second plate.

10. An intermittent feed mechanism including a stationary plate having two parallel slots therethrough, means forming a guide therewith including a stationary member facing a face of said plate opposite said slots, a second plate of elongated rectangular formation facing the other face of said stationary plate and mounted for longitudinal reciprocating movement in its plane longitudinally of said slots, said second plate having openings therein forming a rectangular marginal portion, a central cross portion extending between the long sides, and angle truss portions extending from points adjacent respective ends of the cross portion to the centers of respective end marginal portions and having a slot formed in the cross portion extending between the long sides, a pair of plural toothed similarly disposed ratchet bars guided for longitudinal reciprocating movement in respective slots of said first mentioned plate and engaged between opposed surfaces of the second plate between a marginal end portion and the cross portion thereof for reciprocation with the second plate and for movement with respect thereto to and away from said stationary member, resilient means engaging said second plate and said bars for yieldably urging said bars toward said stationary member, and a rotating crank device engaging the slot of the second plate for reciprocating the same.

11. An intermittent feed mechanism including a stationary plate having two parallel slots therethrough, means forming a guide therewith including a stationary member facing a face of said plate opposite said slots, a second plate of elongated rectangular formation facing the other face of said stationary plate and mounted for longitudinal reciprocating movement in its plane longitudinally of said slots, said second plate having openings therein forming a rectangular marginal portion, a central cross portion extending between the long sides, and angle truss portions extending from points adjacent respective ends of the cross portion to the centers of respective end marginal portions and having a slot formed in the cross portion extending between the long sides, a pair of plural toothed similarly disposed ratchet bars guided for longitudinal reciprocating movement in respective slots of said first mentioned plate and engaged between opposing surfaces of the second plate between a marginal end portion and the cross portion thereof for reciprocation therewith and for movement with respect thereto to and away from said stationary member and having longitudinal grooves therein facing away from said stationary member, bow springs engaged in respective grooves and engaging said second plate for yieldably urging said bars toward said stationary member, said second plate having formations receiving the ends of said springs for longitudinally retaining the same, and a rotating crank device engaging the slot of the second plate for reciprocating the same.

12. An intermittent feed mechanism including a stationary plate having a slot therethrough, means forming a guide therewith including a stationary member facing a face of said plate opposite said slot, a plural toothed ratchet bar guided for longitudinal reciprocating movement in said slot and adapted for movement normal to said plate, a member mounted for reciprocation parallel with said slot opposite the other face of said plate and having oppositely facing surfaces spaced longitudinally of said slot and oppositely engaging said bar to cause the same to reciprocate therewith and adapted to permit movement of the bar normal to the plate, resilient means engaging said reciprocating member and said bar for yieldably urging said bar toward said stationary member, and a rotating device for effecting reciprocation of said reciprocating member.

13. An intermittent feed mechanism including a member mounted for reciprocating movement and having opposed surfaces spaced longitudinally of the movement thereof and having a slot therein disposed transversely of the movement thereof, a ratchet member oppositely engaged between opposed surfaces of said reciprocating member for reciprocation therewith and for movement with respect thereto normal to the said reciprocation, means for limiting movement of said ratchet member in one direction of said second mentioned movement thereof, a spring engaging said first mentioned member and said ratchet member for yieldably urging said ratchet member in said one direction, and a rotating crank device engaging said slot for reciprocating said first mentioned member.

14. An intermittent feed mechanism including a stationary plate having a slot therethrough, means forming a guide therewith including a stationary member facing a face of said plate opposite said slot, a plural toothed ratchet bar guided for longitudinal reciprocating movement in said slot and adapted for movement normal to said plate and having a longitudinal groove therein facing away from said stationary member, a member mounted for reciprocation along said slot opposite the other face of said plate and having opposed surfaces spaced longitudinally of said slot and oppositely engaging said bar to cause the same to reciprocate therewith and adapted to permit movement of the bar normal to the plate, a bow spring engaged in said groove and engaging said reciprocating member for yieldably urging said bars toward said stationary member, said reciprocating member having formations receiving the ends of said bow spring for longitudinally retaining the same, and means for reciprocating said reciprocating member including a rotating device.

15. A film guide including a face engaging guide member, an opposing face engaging guide member movable to and away from said first mentioned guide member, releasable means for locking said guide members in guiding relation adjacent each other, cooperating opposed edge guide members, one of which is mounted with one of said face guide members for movement to and from the other edge guide member, and resilient means mounted with the other face guide member and adapted to engage said movable edge guide member and to yieldably urge the same toward the other edge guide member when said face guide members are in guiding relation.

16. A film guide including a face engaging guide member, an opposing face engaging guide member movable to and away from said first mentioned guide member, releasable means for locking said guide members in guiding relation adjacent each other, cooperating edge guide members, one of which is mounted with one of said face guide members for movement to and from the other edge guide member, resilient means urging said movable edge guide member away from the other edge guide member, and resilient means mounted with the other face guide member and adapted to yieldably urge said movable edge guide member toward the other edge guide member against the influence of said first mentioned resilient means when said face guide members are in guiding relation.

17. A film guide including a face engaging guide member, an opposing face engaging guide member pivotally supported for movement to and away from said first mentioned guide member, releasable means for locking said guide members in guiding relation adjacent each other, cooperating edge guide members, one of which is mounted with one of said face guide members for movement to and from the other edge guide member, resilient means urging said movable edge guide member away from the other edge guide member, and resilient means mounted with the other face guide member and adapted to engage said movable edge guide member to yieldably urge the same toward the other edge guide member against the influence of said first mentioned resilient means when said face guide members are in guiding relation, said movable guide member having a slanted surface adapted to be engaged by said second mentioned resilient means during movement of said face guide members toward each other adapted to permit such movement without interference.

18. An intermittent feed mechanism including a pair of opposing face guide members relatively movable to and away from each other, one of said guide members having a pair of parallel slots therethrough, advancing means including a pair of ratchet toothed bars guided for longitudinal reciprocating movement in respective slots and adapted for movement therein to and from the other face guide member and resilient means yieldably urging said bars toward said other face guide member, means limiting movement of said bars relatively to said slotted face guide member toward said other face guide member, releasable means for locking said guide members in guiding relation adjacent each other, a pair of opposed edge guide members, one of which is movably mounted with one face guide member for movement to and from the other edge guide member, and resilient means mounted with the other face guide member and adapted to engage said movable edge guide member and to yieldably urge the same toward the other edge guide member when said face guide members are in guiding relation.

19. An intermittent feed mechanism including a pair of opposing face guide members relatively movable to and away from each other, one of said guide members comprising a plate and having a pair of parallel slots therethrough, advancing means including a pair of ratchet toothed bars guided for longitudinal reciprocating movement in respective slots of said plate and adapted for movement therein to and from the other face guide member and resilient means yieldably urging said bars toward said other face guide member, longitudinal flanges on said bars adapted to engage said plate to limit movement of said bars toward said other face guide member, releasable means for locking said guide members in guiding relation adjacent each other, a pair of opposed edge guide members, one of which is movably mounted with one face guide member for movement to and from the other edge guide member, and resilient means mounted with the other face guide member and adapted to engage said movable edge guide member and to yieldably urge the same toward the other edge guide member when said face guide members are in guiding relation.

20. An intermittent feed mechanism including a stationary support, a second support mounted for movement with relation thereto, an intermittent feed device carried by said movable support including a rotating member, means for rotating said rotating member including a gear carried with said second support and a second gear meshing therewith and carried with said stationary support, said gears being adapted to remain in mesh during movement of said second support through several positions, and releasable means for locking said second support with said first mentioned support in one of said positions.

21. An intermittent feed mechanism including a stationary support, a second support pivotally mounted thereon, an intermittent feed device carried by said movable support including a rotating member, means for rotating said rotating member including a spur gear carried with said second support and disposed on an axis normal to and spaced from the pivotal axis of said second support and a second spur gear mounted with said first mentioned support and meshing with said first mentioned gear, said gears being disposed to remain in mesh during movement of said second support through several positions of its pivotal movement, and releasable means for locking said second support with said first mentioned support in one of said positions.

22. An intermittent feed mechanism including a stationary support, a second support mounted for movement with relation thereto, guide means including opposed guide members carried by respective supports and disposed in guiding relation adjacent each other when said second support is in one position of its movement, an intermittent feed device carried by said movable support including a rotating member, means for rotating said rotating member including a gear carried with said second support and a second gear meshing therewith and carried with said stationary support, said gears being adapted to remain in mesh during movement of said second support to and from said one position, and releasable means for locking said second support with said guide members in guiding relation.

23. An intermittent feed mechanism including a stationary support, a second support pivotally mounted thereon, guide means including opposed guide members carried by respective supports and disposed in guiding relation adjacent each other when said second support is in one position of its movement, an intermittent feed device carried by said movable support including a rotating member, means for rotating said rotating member including a spur gear carried with said second support and disposed on an axis normal to and spaced from the pivotal axis of said second support and a second spur gear mounted with said first mentioned support and meshing with said first mentioned gear, said gears being disposed to remain in mesh during movement of said second support to and from said one position, and releasable means for locking said second support with said guide members in guiding relation.

24. An intermittent feed mechanism including a stationary plate having two parallel slots therethrough, means forming a guide therewith including a stationary guide member facing a face of said plate opposite said slots, a second plate facing the other face of said stationary plate and mounted for reciprocation in its plane longitudinally of said slots, said second plate having openings forming oppositely facing surfaces spaced longitudinally of said slots, a pair of ratchet toothed bars guided for longitudinal movement in respective slots and oppositely engaged by said oppositely facing surfaces of said second plate for reciprocation therewith and for movement with respect thereto to and away from said stationary guide member, springs for yieldably urging said bars toward said stationary guide member, a rotating device for reciprocating said second plate, and springs adapted to engage said second plate at respective ends of its stroke for cushioning and aiding in the reversal of the same.

In witness whereof I hereunto affix my signature this sixth day of September, 1921, A. D.

ALBERT S. HOWELL.